US009882612B2

(12) United States Patent
Da Silveira et al.

(10) Patent No.: US 9,882,612 B2
(45) Date of Patent: Jan. 30, 2018

(54) MULTI-SECTOR ANTENNA INTEGRATED RADIO UNIT

(71) Applicant: Telefonaktiebolaget LM Ericsson (publ), Stockholm (SE)

(72) Inventors: Marthinus Willem Da Silveira, Ottawa (CA); Neil McGowan, Stittsville (CA); Slim Ben Ghalba, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/306,036

(22) PCT Filed: Apr. 30, 2014

(86) PCT No.: PCT/IB2014/061124
§ 371 (c)(1),
(2) Date: Oct. 21, 2016

(87) PCT Pub. No.: WO2015/166305
PCT Pub. Date: Nov. 5, 2015

(65) Prior Publication Data
US 2017/0054478 A1    Feb. 23, 2017

(51) Int. Cl.
*H04M 1/00* (2006.01)
*H04B 7/04* (2017.01)
*H04B 1/04* (2006.01)
*H04W 88/08* (2009.01)

(52) U.S. Cl.
CPC .............. *H04B 7/04* (2013.01); *H04B 1/04* (2013.01); *H04W 88/08* (2013.01)

(58) Field of Classification Search
CPC .................................. H04B 7/04; H04B 1/04
USPC ..................... 455/561, 562.1, 63.4
See application file for complete search history.

(56) References Cited

U.S. PATENT DOCUMENTS

| 5,559,791 A | 9/1996 | Bremer et al. |
| 5,805,575 A | 9/1998 | Kamin, Jr. |
| 5,825,762 A | 10/1998 | Kamin, Jr. et al. |
| 5,834,972 A | 11/1998 | Schiemenz, Jr. et al. |
| 5,854,611 A | 12/1998 | Gans et al. |

(Continued)

FOREIGN PATENT DOCUMENTS

| CN | 202168076 U | 3/2012 |
| EP | 0704964 A2 | 4/1996 |

(Continued)

OTHER PUBLICATIONS

Non-final Office Action for U.S. Appl. No. 13/705,704, dated Apr. 21, 2014, 18 pages.

(Continued)

*Primary Examiner* — Md Talukder
(74) *Attorney, Agent, or Firm* — Patent Portfolio Builders, PLLC

(57) ABSTRACT

Embodiments of a system for a multi-sector base station in a cellular communications network are disclosed. In one embodiment, the system includes an integrated unit, where the integrated unit includes multiple antennas and a radio unit (RU) coupled to the antennas. By integrating the multiple antennas and the radio RU into a single integrated unit, the system can, in some embodiments, reduce installation and operating costs of the multi-sector base station.

18 Claims, 7 Drawing Sheets

(56) References Cited

U.S. PATENT DOCUMENTS

| | | | |
|---|---|---|---|
| 5,854,986 A | 12/1998 | Dorren et al. | |
| 5,913,177 A | 6/1999 | Meredith et al. | |
| 6,006,111 A | 12/1999 | Rowland | |
| 6,006,113 A | 12/1999 | Meredith | |
| 6,052,605 A | 4/2000 | Meredith et al. | |
| 6,728,554 B1 | 4/2004 | Wegner | |
| 7,206,355 B2 | 4/2007 | McGowan et al. | |
| 7,245,938 B2* | 7/2007 | Sobczak | H01Q 1/246 342/373 |
| 7,248,656 B2* | 7/2007 | da Silveira | H03F 1/3241 375/346 |
| 7,746,966 B2 | 6/2010 | Lee et al. | |
| 7,904,027 B2 | 3/2011 | Onoda | |
| 7,962,145 B2 | 6/2011 | Gale et al. | |
| 8,090,326 B1 | 1/2012 | Wu et al. | |
| 8,201,050 B2 | 6/2012 | Choi et al. | |
| 8,204,544 B2 | 6/2012 | Beaudin et al. | |
| 8,213,880 B2 | 7/2012 | van Zelm et al. | |
| 8,275,081 B2 | 9/2012 | Jiang et al. | |
| 8,362,955 B2 | 1/2013 | Adams et al. | |
| 8,504,109 B2 | 8/2013 | McGowan et al. | |
| 8,588,334 B2 | 11/2013 | McGowan et al. | |
| 9,036,323 B1* | 5/2015 | White | H02H 1/04 361/218 |
| 9,240,813 B2* | 1/2016 | McGowan | H04B 1/0483 |
| 9,637,248 B2* | 5/2017 | Cook, Jr. | B64G 1/222 |
| 2001/0016504 A1* | 8/2001 | Dam | H04W 16/28 455/562.1 |
| 2001/0036843 A1* | 11/2001 | Thompson | H01Q 1/246 455/562.1 |
| 2004/0105509 A1 | 6/2004 | McGowan et al. | |
| 2004/0209572 A1* | 10/2004 | Thomas | H01P 1/184 455/63.4 |
| 2004/0228422 A1* | 11/2004 | Silveira | H03F 1/3241 375/299 |
| 2006/0221905 A1* | 10/2006 | Behzad | H04B 1/40 370/335 |
| 2008/0242347 A1* | 10/2008 | Zetterman | G06F 15/7867 455/552.1 |
| 2008/0287163 A1 | 11/2008 | Skarby et al. | |
| 2009/0023477 A1* | 1/2009 | Staudte | H04W 16/28 455/562.1 |
| 2009/0298451 A1* | 12/2009 | Malaga | H04B 1/40 455/129 |
| 2012/0083317 A1* | 4/2012 | Athley | H04B 7/04 455/562.1 |
| 2013/0021104 A1* | 1/2013 | Schmidt | H03F 1/0277 330/295 |
| 2013/0022152 A1 | 1/2013 | McGowan et al. | |
| 2013/0225222 A1 | 8/2013 | Ma et al. | |
| 2013/0294445 A1* | 11/2013 | Chase | H04Q 11/04 370/357 |
| 2014/0153666 A1* | 6/2014 | McGowan | H04B 1/0483 375/295 |
| 2016/0164592 A1 | 6/2016 | McGowan et al. | |

FOREIGN PATENT DOCUMENTS

| | | |
|---|---|---|
| EP | 0725498 A1 | 8/1996 |
| WO | 9506369 A1 | 3/1995 |
| WO | 2013014574 A1 | 1/2013 |

OTHER PUBLICATIONS

Final Office Action for U.S. Appl. No. 13/705,704, dated Sep. 5, 2014, 28 pages.
Non-final Office Action for U.S. Appl. No. 13/705,704, dated May 13, 2015, 10 pages.
Notice of Allowance for U.S. Appl. No. 13/705,704, dated Sep. 2, 2015, 10 pages.
Corrected Notice of Allowance for U.S. Appl. No. 13/705,704, dated Sep. 30, 2015, 7 pages.
Invitation to Pay Additional Fees and Partial Search for PCT/IB2013/060605, dated Apr. 14, 2014, 5 pages.
International Search Report and Written Opinion for PCT/IB2013/060605, dated Jul. 7, 2014, 15 pages.
International Preliminary Report on Patentability for International Patent Application No. PCT/IB2013/060605, dated Jun. 18, 2015, 11 pages.
International Search Report and Written Opinion for PCT/IB2014/061124, dated Dec. 8, 2014, 12 pages.
Non-Final Office Action for U.S. Appl. No. 14/996,340, dated Sep. 15, 2016, 12 pages.

* cited by examiner

MULTI-SECTOR ANTENNA INTEGRATED RADIO UNIT

This application is a 35 U.S.C. § 371 national phase filing of International Application No. PCT/IB2014/061124, filed Apr. 30, 2014, the disclosure of which is incorporated herein by reference in its entirety.

FIELD OF THE DISCLOSURE

The present disclosure relates to a base station in a cellular communications network.

BACKGROUND

In a cellular communications network, some or all of the cells may be divided into two or more sectors. For instance, FIG. 1 illustrates a cell 10 of a cellular communications network that is divided into three sectors 12-1, 12-2, and 12-3, which are generally referred to herein as sectors 12. Conventionally, a base station (e.g., a Node-B, an enhanced Node-B (eNB), or a Base Transceiver Station (BTS)) serving the cell 10 includes a separate amplifier and antenna for each of the sectors 12. The antennas are so-called sector antennas that radiate corresponding beams 14-1 through 14-3 that fill the corresponding sectors 12 with limited overlap into adjacent sectors 12. For the conventional base station, there is no power sharing between power amplifiers for the sectors 12 and, as such, the amplifier for each of the sectors 12 must be designed to satisfy maximum power level demands for the sector 12. In addition, if one of the power amplifiers or the corresponding transceiver fails, the downlink in the corresponding sector 12 is totally lost.

As one solution to the lack of power sharing, U.S. Pat. No. 7,206,355, entitled DIGITALLY CONVERTIBLE RADIO, and U.S. patent application Ser. No. 13/705,704, entitled DISTRIBUTED DIGITALLY CONVERTIBLE RADIO (DDCR), disclose embodiments of a Digitally Convertible Radio (DCR) and a Distributed Digitally Convertible Radio (DDCR), respectively. In one embodiment, the DCR or DDCR includes multiple parallel power amplifiers and enables power sharing between the power amplifiers such that any one of the power amplifiers is not required to be designed to satisfy maximum sector power level demands. The DCR and DDCR allow power sharing and connectivity for up to N radio transceivers and up to N antennas. An N×N Analog Hybrid Matrix (AHM) enables this functionality. In the DCR, the AHM is included within the DCR. Conversely, in the DDCR, the AHM is external to the DDCR in order to enable flexible use of radio units to, e.g., scale and share radio frequency (RF) power, scale the number of sectors, and/or scale capacity.

Additionally, in order to reduce capital and operating expenses, the number of components that must be installed on a tower or other structure should be limited. In some cases, the installation costs and ongoing site lease payments are dependent on the number of components installed. Also, additional components add complexity to the system and may necessitate additional safety precautions such as lightning protection. One way of addressing this problem is an Antenna Integrated Radio (AIR) unit, which is a product manufactured and sold by Ericsson. An AIR unit combines a radio unit and an antenna into an integrated unit. AIR units reduce the cost of installation by reducing the number of components to be installed, and lead to, for example, increased efficiency due to shared heat dissipation.

AIR units are typically single-sector solutions. For a multi-sector base station, multiple AIR units are typically installed in a multi-sector configuration. Each of these AIR units requires resources such as a power source and lightning protection on the power connections. Additionally, when there are low traffic conditions either upon initial deployment or at off-peak times, the single-sector AIR units offer little flexibility in terms of deployment cost and power savings. The DDCR discussed above allows for multi-sector flexible sharing of radio resources. However, implementing the DDCR concept when using multiple single-sector AIR units for a multi-sector base station is infeasible. The DDCR concept requires an external AHM, but the single-sector AIR units do not provide a common access point for the feeder cables for all three sector cables to be connected to the external AHM. As such, there is a need for an improved AIR unit that addresses these issues.

SUMMARY

Embodiments of a system for a multi-sector base station in a cellular communications network are disclosed. In one embodiment, the system includes an integrated unit, where the integrated unit includes multiple antennas serving a plurality of sectors and a radio unit (RU) coupled to the antennas. By integrating the multiple antennas and the RU into a single integrated unit, the system can, in some embodiments, reduce installation and operating costs of the multi-sector base station.

In one embodiment, the integrated unit further includes an Analog Hybrid Matrix (AHM). The AHM includes a number of feeder ports and a number of antenna ports. The RU is coupled to a corresponding one of the feeder ports. Each of the antennas is coupled to a different one of the antenna ports of the AHM. By using the AHM, in some embodiments, the system implements power sharing between the multiple sectors.

In one embodiment, the system also includes one or more additional RUs that together with the RU form a number of RUs of the system. Each RU of the system is coupled to a different one of the feeder ports of the AHM. In one embodiment, the one or more additional RUs are physically attached to the integrated unit, and the number of additional RUs is reconfigurable. In one embodiment, the one or more additional RUs are included in the integrated unit. In one embodiment, each of the one or more additional RUs is configurable in either an active state or an inactive state.

In one embodiment, the RU is a multi-sector RU. In one embodiment, the RUs are phase-locked.

In one embodiment, the integrated unit includes a grounded enclosure that provides lightning protection. In another embodiment, the integrated unit further includes panels where each panel includes one or more of the antennas and each pair of adjacent panels is joined by a corresponding flexible connection that allows the integrated unit to be folded around an existing structure.

In one embodiment, a method of configuring a system for a multi-sector base station in a cellular communications network includes determining a number of RUs desired for the system and adjusting the reconfigurable number of RUs. In one embodiment, adjusting the reconfigurable number of RUs includes physically adding or removing RUs from the system. In one embodiment, adjusting the reconfigurable number of RUs includes electronically activating or deactivating RUs in the system.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
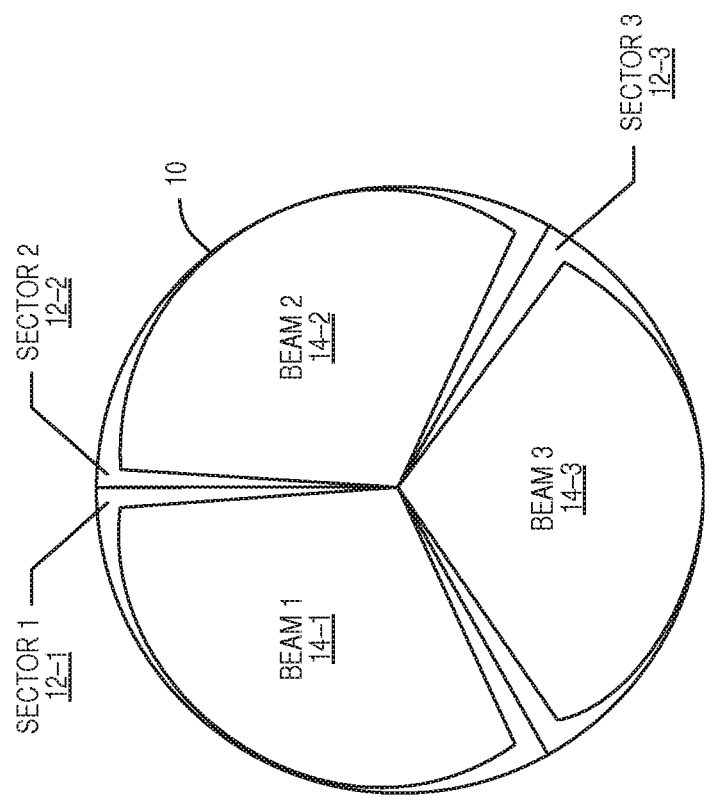
FIG. 1 illustrates a cell having multiple sectors.
Figure 2:
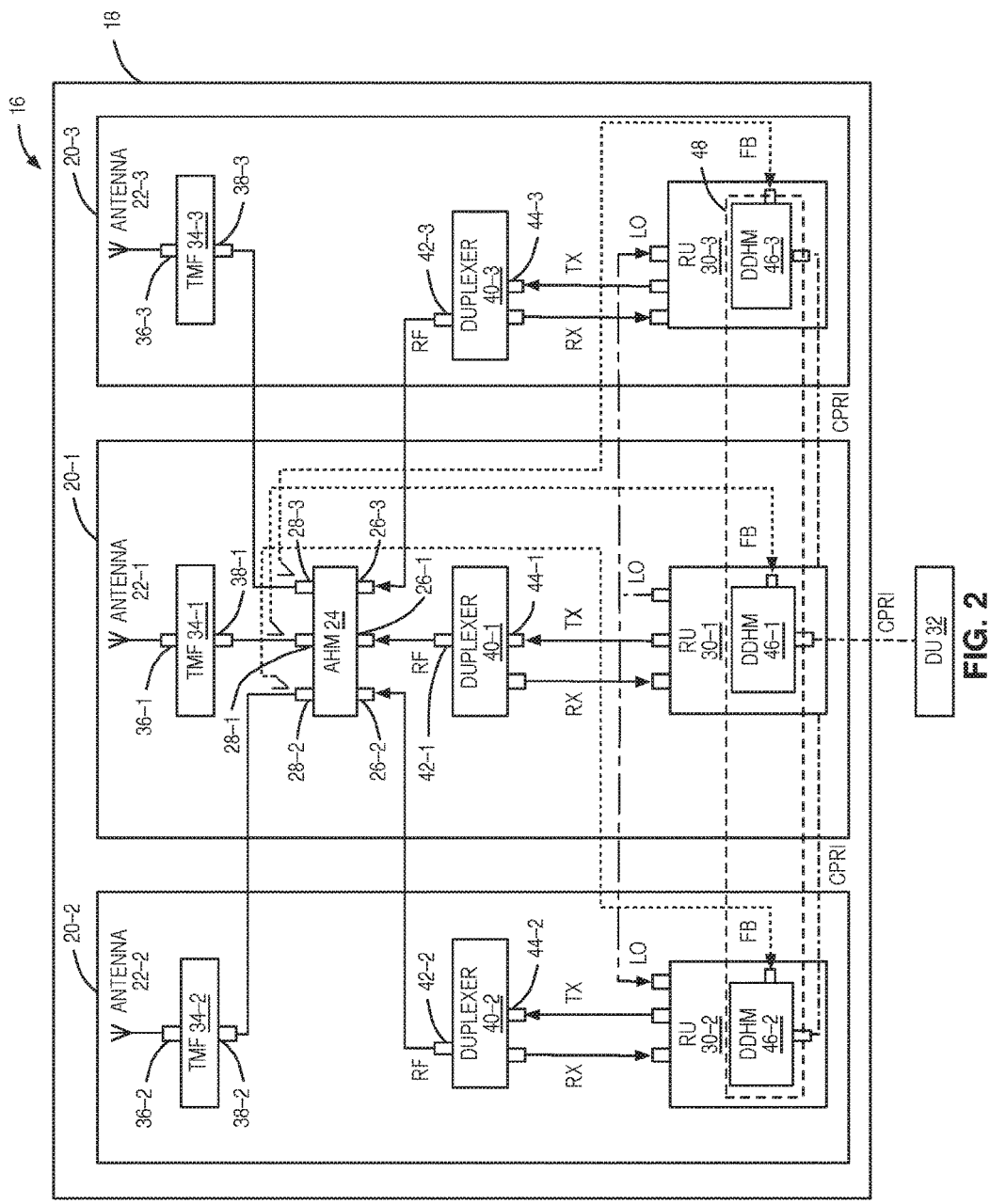
FIG. 2 is a block diagram of a system with an integrated unit and multiple radio units (RUs) according to one embodiment of the present disclosure.

Embodiments of a system for a multi-sector base station in a cellular communications network are disclosed. In this regard, FIG. 2 illustrates a system 16 for a multi-sector base station that includes an integrated unit 18 according to one embodiment of the present disclosure. In this embodiment, the integrated unit 18 is composed of three panels 20-1 through 20-3 (generally referred to herein collectively as panels 20 and individually as panel 20) that are, in some embodiments, flexibly connected. The integrated unit 18 includes three antennas 22-1 through 22-3 (generally referred to herein collectively as antennas 22 and individually as antenna 22), one for each sector, located in the three panels 20. While only one antenna 22 is shown in each panel in this disclosure, the system 16 is not limited thereto.

The integrated unit 18 also includes an AHM 24. The AHM includes a number of feeder ports 26-1 through 26-3 (generally referred to herein collectively as AHM feeder ports 26 and individually as AHM feeder port 26), and a number of antenna ports 28-1 through 28-3 (generally referred to herein collectively as antenna ports 28 and individually as antenna port 28), operative to connect to the antennas 22. The system 16 also includes three RUs 30-1 through 30-3 (generally referred to herein collectively as RUs 30 and individually as RU 30) coupled to corresponding AHM feeder ports 26. The RU 30-1 receives a signal from a digital unit (DU) 32 via, in this example, a Common Public Radio Interface (CPRI) connection and communicates with the other RUs 30 via CPRI connections as shown, according to some embodiments.

Note that while the integrated unit 18 includes three antennas 22 and three RUs 30 in this example, the integrated unit 18 may include any number of two or more antennas 22 and any number of one or more RUs 30. The number of antennas 22 may or may not be equal to the number of RUs 30. Further, as discussed below, in this embodiment, the number of RUs 30 is reconfigurable. Note, however, that in other embodiments, the number of RUs 30 may not be reconfigurable. In an embodiment where the integrated unit 18 includes an RU 30 and the number of RUs 30 is reconfigurable, the integrated unit 18 is referred to as a reconfigurable multi-sector antenna integrated radio (RM-SAIR) unit. Also, in some embodiments, the integrated unit 18 includes a grounded enclosure that provides additional lightning protection for the components (e.g., the RUs 30, duplexers 40, the AHM 24, and TMFs 34) that are inside the grounded enclosure and the connections between them.

In the embodiment of FIG. 2, the RUs 30 are included in the integrated unit 18. However, in other embodiments, one or more of the RUs 30 are external to the integrated unit 18 and physically attached to the integrated unit 18. For example, in one embodiment, the external RU(s) 30 are physically attached to the integrated unit 18 by inserting the external RU(s) 30 into corresponding slots or cavities in the integrated unit 18. In one embodiment, the slots or cavities are such that, when inserted into the slots or cavities, the external RU(s) 30 become(s) effectively integrated into (but not actually integrated into) the integrated unit 18 (e.g., for purposes of shielding or lightning protection). In one particular alternative embodiment, at least one (and possibly external to the integrated unit 18. In another alternative embodiment, all of the RUs 30 are external to the integrated unit 18.

The integrated unit 18 also includes one or more components between the AHM 24 and the antennas 22. These components are referred to herein as antenna equipment. In the example of FIG. 2, the antenna equipment includes tower mounted frequency shift equipment (TMF) 34-1 through 34-3 (generally referred to herein collectively as TMFs 34 and individually as TMF 34). In some embodiments, the TMFs 34 are implemented within corresponding tower mounted amplifiers (TMA). However, in other embodiments, the TMFs 34 are implemented separately from the TMAs, which are not shown but would also be integrated into the integrated unit 18. The TMFs 34 have first ports 36 that are coupled to corresponding antennas 22. Similarly, the TMFs 34 include second ports 38 that are coupled to corresponding antenna ports 28 of the AHM 24 via feeder cables.

In some embodiments, the TMFs 34 are configured to apply different frequency shifts to the radio frequency (RF) receive signals such that the RF receive signals provided to the antenna ports 28 are each at a different carrier frequency. For more details regarding the frequency shifting applied by the TMFs 34, the interested reader is directed to U.S. Patent Application Publication No. 2008/0287163 A1, entitled METHOD AND APPARATUS FOR CONVERTING BETWEEN A MULTI-SECTOR, OMNI-BASE STATION CONFIGURATION AND A MULTI-SECTOR BASE STATION CONFIGURATION, which was published on Nov. 20, 2008, and is hereby incorporated herein by reference for its teachings on the TMFs 34. In an embodiment where the number of transceivers matches the number of antennas 22, there may be no need for different frequency shifts, in which case the TMFs 34 either may not be included or may be configured to impart the same frequency shift, e.g., a frequency shift of 0.

The integrated unit 18 also includes duplexers 40-1 through 40-3 (generally referred to herein collectively as duplexers 40 and individually as duplexer 40) connected between the RUs 30 and the AHM 24. Specifically, the duplexers 40 have first ports 42-1 through 42-3 (generally referred to herein collectively as first ports 42 and individually as first port 42) coupled to corresponding feeder ports 26 of the AHM 24 via corresponding feeder cables. Similarly, the duplexers 40 have second ports 44-1 through 44-3 (generally referred to herein collectively as second ports 44 and individually as second port 44) coupled to the corresponding RUs 30 via corresponding feeder cables. The duplexers 40 enable the simultaneous bidirectional flow of RF signals between the RUs 30 and the AHM 24.

In this embodiment, as discussed above, the AHM 24 includes three antenna ports 28 connected to the antennas 22 via the TMFs 34. Note, however, that the TMFs 34 are optional and, as such, may not be included in some embodiments or implementations of the system 16. The AHM 24 also includes the three feeder ports 26 that enable the AHM 24 to connect to the RUs 30 via corresponding feeder cables. Note that while in this example the AHM 24 is a 3×3 AHM having three antenna ports 28 and three feeder ports 26, the AHM 24 is not limited thereto. The AHM 24 is more generally an N×N AHM, where N is greater than or equal to 2, such that the system 16 can support multiple RUs 30 having any number, up to N, of transceivers and any number, up to N, of antennas 22. While each RU 30 described herein includes only a single transceiver, in some embodiments, a RU 30 can include multiple transceivers.

The RUs 30 include Distributed Digital Hybrid Matrix (DDHM) components 46-1 through 46-3 (generally referred to herein collectively as DDHM components 46 and individually as DDHM component 46), according to one embodiment. Together, the DDHM components 46 of the RUs 30 form a DDHM 48. In this particular embodiment, the DDHM 48 is a 3×3 DDHM that is distributed across the RUs 30. Note, however, that the DDHM 48 is not limited to being a 3×3 DDHM and can more generally be an N×N DDHM in order to support any number of digital transmit signals (e.g., N digital transmit signals corresponding to N sectors) and any number of transmitters. In general, the DDHM components 46 are configured such that the DDHM 48 is effectively an inverse of the AHM 24 such that intended RF transmit signals for the different sectors are output by the AHM 24 on the antenna ports 28. In addition, the DDHM 48 is preferably further configured to compensate for any downstream errors between the DDHM components 46 and the AHM 24.

In order to configure complex weights of the DDHM 48, the system 16 includes feedback paths that provide representations of the signals produced at the antenna ports 28 of the AHM 24. While not essential for understanding the embodiments described herein, for more information regarding the DDHM 48 and various algorithms for using feedback signals for computing the complex weights for the DDHM 48, the interested reader is directed to U.S. Pat. No. 7,248,656 B2, entitled DIGITAL CONVERTIBLE RADIO SNR OPTIMIZATION, and U.S. patent application Ser. No. 13/705,704 entitled DISTRIBUTED DIGITALLY CONVERTIBLE RADIO (DDCR), both of which are incorporated herein by reference for their teachings related to the DDHM 48.

An important benefit of using the DDHM 48 and the AHM 24 is coherent power sharing between power amplifiers in the transmit chains. As a result, any one of the power amplifiers in the transmit chains is not required to be designed to satisfy maximum sector power level demands. In addition, if any one of the power amplifiers fails, the system 16 is enabled to provide operation in all three sectors, but in a somewhat degraded mode of operation. Note that a reference local oscillator (LO) signal is shared by the RUs 30 and enables the RUs 30 to be phase-locked, which assists in the proper operation of the RUs 30, according to one embodiment.

Figure 3:
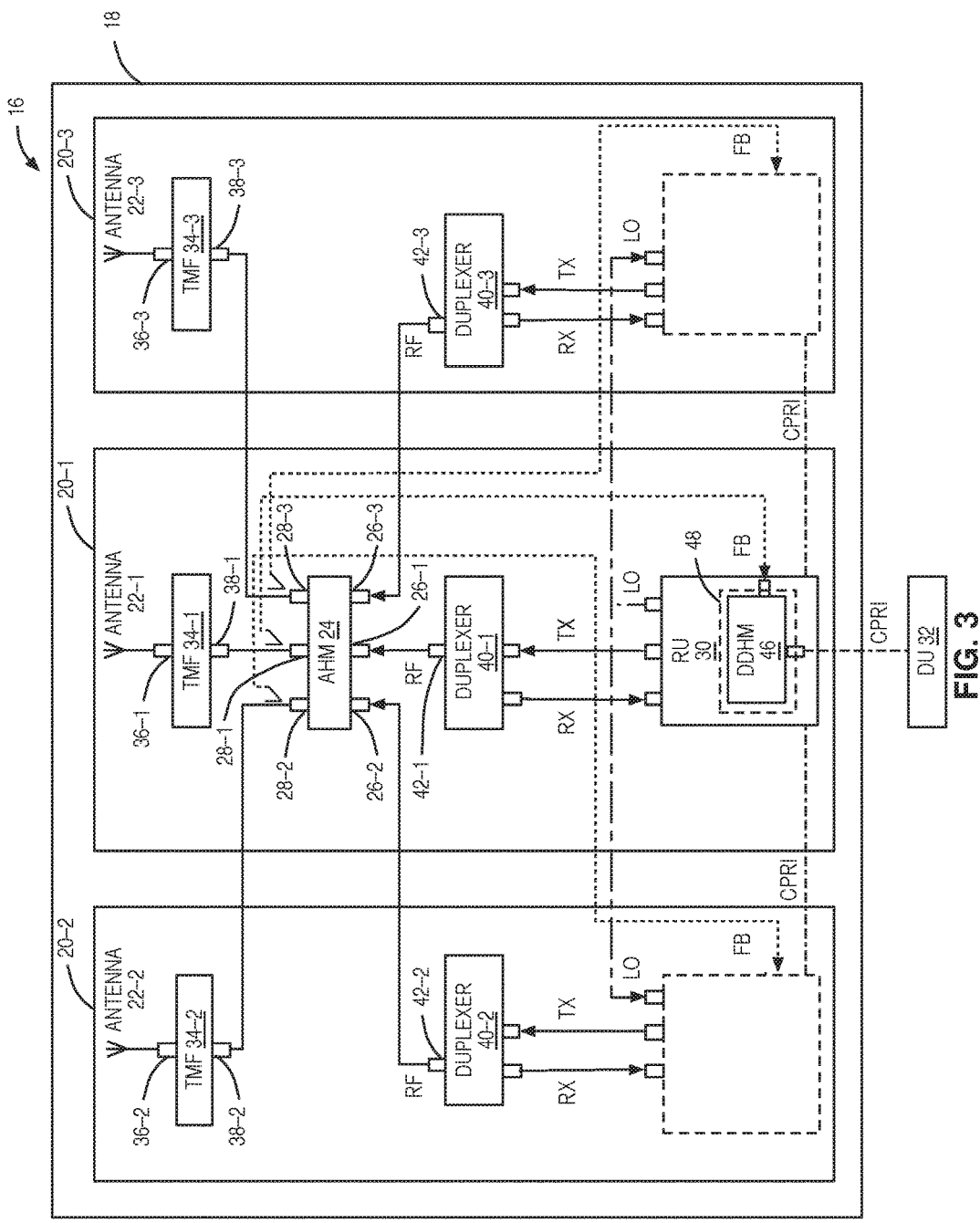
FIG. 3 is a block diagram of a system with one RU according to one embodiment of the present disclosure.

While three RUs 30 are shown in the system 16 of FIG. 2, the number of RUs 30 in the system 16 may be reconfigurable. FIG. 3 shows another embodiment of the system 16 described in FIG. 2, where the integrated unit 18 only includes a single RU 30. Additional RUs 30 may be added at a later time, according to one embodiment. For example, at the time of initial deployment, the operator may include only one RU 30 in the system 16. As capacity needs increase, the operator may then connect additional RUs 30 to obtain additional capacity. In this embodiment, the system 16 operates in a lower capacity mode of operation. The spaces corresponding to RUs 30-2 and 30-3 of FIG. 2 are now shown as dashed boxes to indicate that the number of RUs 30 can be reconfigured by physically adding or removing RUs 30, e.g., from slots or cavities in the integrated unit 18 represented by the dashed boxes. Physically adding more RUs 30 may increase the overall capacity of the system. Similarly, physically removing RUs 30 (or not installing them to begin with) may reduce the overall equipment cost.

In this embodiment, since there is only a single RU 30, the DDHM 48 includes only the DDHM component 46. Again, the DDHM 48 is effectively an inverse of the AHM 24. In addition, the DDHM 48 is preferably further configured to compensate for any downstream errors between the DDHM component 46 and the AHM 24. In order to configure the complex weights of the DDHM 48, the integrated unit 18 includes feedback paths that provide representations of the signals produced at the antenna ports 28 of the AHM 24. Also, in some embodiments, the integrated unit 18 includes a grounded enclosure that provides additional lightning protection for the components that are inside the grounded enclosure and the connections between them.

In this configuration, the AHM 24 communicates with only one RU 30 through a single feeder port 26 (i.e., the feeder port 26-1). The AHM 24 still communicates with the multiple antennas 22 (three in this embodiment). With regard to transmitting from the multi-sector base station, the RU 30 outputs a single RF transmit signal that includes components from each of the RF transmit signals of the different sectors. The AHM 24 then splits the RF transmit signal to provide RF transmit signals for the different sectors at the corresponding antenna ports 28.

With regard to processing the three separate signals received from the three antennas 22, the TMFs 34 are configured to apply different frequency shifts to the RF receive signals such that the RF receive signals provided to the antenna ports 28 of the AHM 24 are each at a different carrier frequency. For example, the TMF 34-1 may apply a frequency shift of $-\Delta f$ relative to the center of the carrier frequency f where $\Delta f$ is relatively small relative to f; the TMF 34-2 may apply a frequency shift of 0; and the TMF 34-3 may apply a frequency shift of Δf relative to the center of the frequency f. The AHM 24 combines the frequency-shifted RF receive signals to provide RF receive signals that include components for each of the sectors (at different carrier frequencies) at each of the feeder ports 26. The single RU 30 processes the RF receive signal from the corresponding feeder port 26-1 of the AHM 24 to provide a baseband signal that includes a separate component for each of the sectors. In this manner, the RF receive signals for the different antennas 22 can be distinguished by the DU 32.

Figure 4:
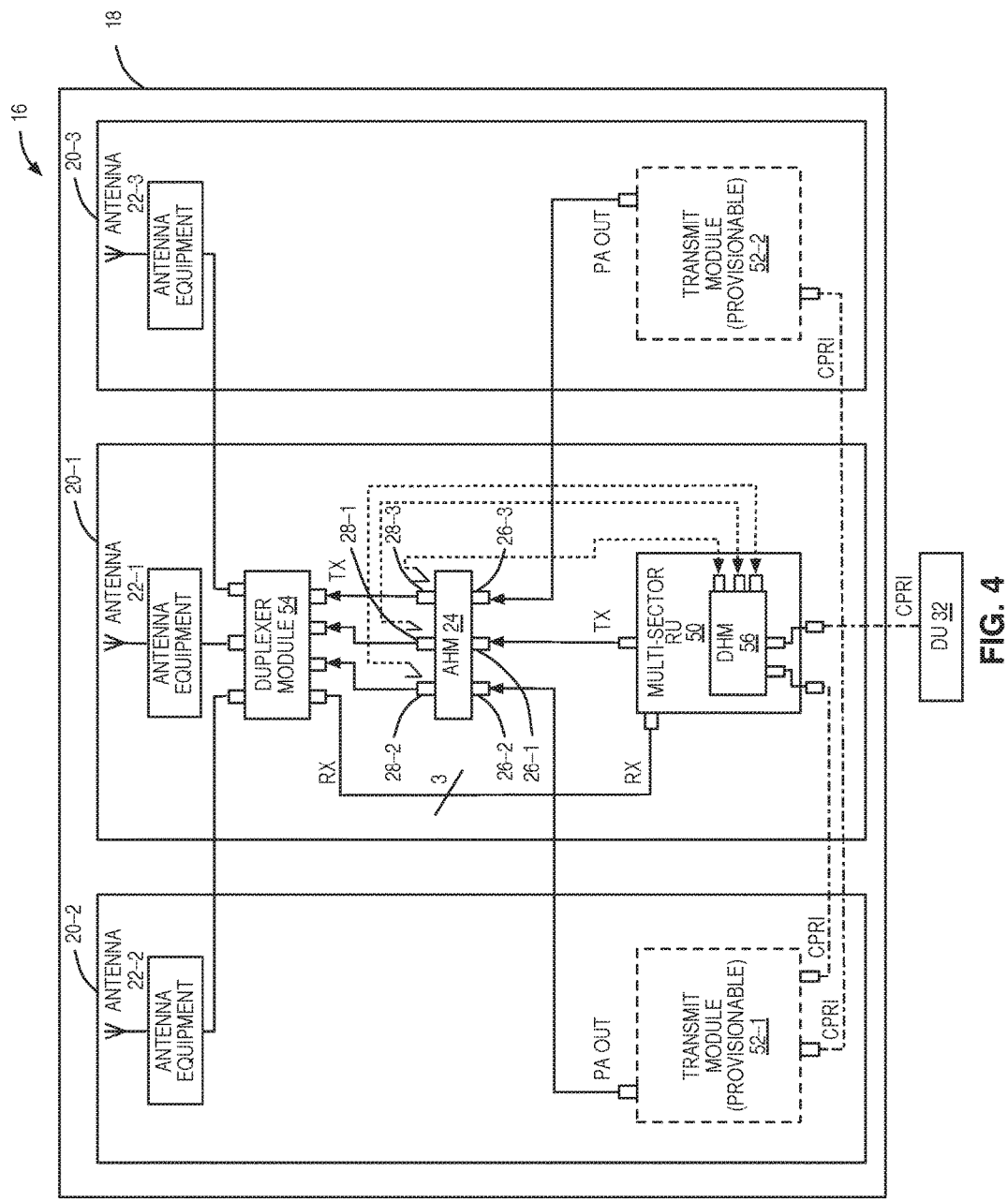
FIG. 4 is a block diagram of a system with a multi-sector RU according to one embodiment of the present disclosure.

FIG. 4 illustrates an embodiment of the present disclosure that is similar to those of FIGS. 2 and 3 except that the integrated unit 18 of the system 16 includes a single multi-sector RU 50 and, in some embodiments, a number of transmit modules such as transmit modules 52-1 and 52-2 (generally referred to herein collectively as transmit modules 52 and individually as transmit module 52). In this embodiment, the system 16 is reconfigurable in that the number of transmit modules 52 is reconfigurable from zero (0) to, in this example, two (2). Note, however, that the system 16 may include any number of transmit modules 52. In this embodiment, the system 16 operates in a lower capacity mode of operation. Dashed boxes indicate that the number of transmit modules 52 can be reconfigured by physically adding or removing transmit modules 52 to or from, e.g., slots or cavities in the integrated unit 18 represented by the dashed boxes. In this embodiment, the multi-sector RU 50 is capable of generating RF transmission signals for multiple sectors. As with other embodiments, the AHM 24 serves to transform the received transmission signals into the appropriate signals for the plurality of antennas 22. Also, in some embodiments, the integrated unit 18 includes a grounded enclosure that provides additional lightning protection for the components that are inside the grounded enclosure and the connections between them.

If additional transmission capacity is desired, one or more additional transmit modules 52 like the transmit modules 52-1 and 52-2 may be added. In both the embodiment with only the multi-sector RU 50 and the embodiment with one or more additional transmit modules 52, all received signals are sent to the single multi-sector RU 50 for processing. A duplexer module 54 includes the necessary circuitry for providing the received signals from the plurality of antennas 22 to the single multi-sector RU 50. The duplexer module 54 also includes the necessary circuitry for providing the output of the AHM 24 to the plurality of antennas 22.

In this embodiment, instead of having a DDHM distributed between multiple RUs, there is only a single Digital Hybrid Matrix (DHM) 56. In this particular embodiment, the DHM 56 is a 3×3 DHM. Note, however, that the DHM 56 is not limited to being a 3×3 DHM and can more generally be of any size in order to support any number of digital transmit signals and any number of antennas 22. In general, the DHM 56 is configured such that the DHM 56 is effectively an inverse of the AHM 24. In addition, the DHM 56 is preferably further configured to compensate for any downstream errors between the DHM 56 and the AHM 24. In order to configure the complex weights of the DHM 56, the system 16 includes feedback paths that provide representations of the signals produced at the antenna ports 28 of the AHM 24. Since there is only one multi-sector RU 50 in this embodiment, all of the feedback signals lead to the DHM 56 and are used to configure the complex weights. Both the multi-sector RU 50 and the transmit module 52-1 are shown with two CPRI ports. In one embodiment, this is to enable the communication between the multi-sector RU 50 and the one or more transmit modules 52 to be daisy-chained. In another embodiment, a separate CPRI connection from the multi-sector RU 50 to each transmit module 52 could be provided.

Figure 5:
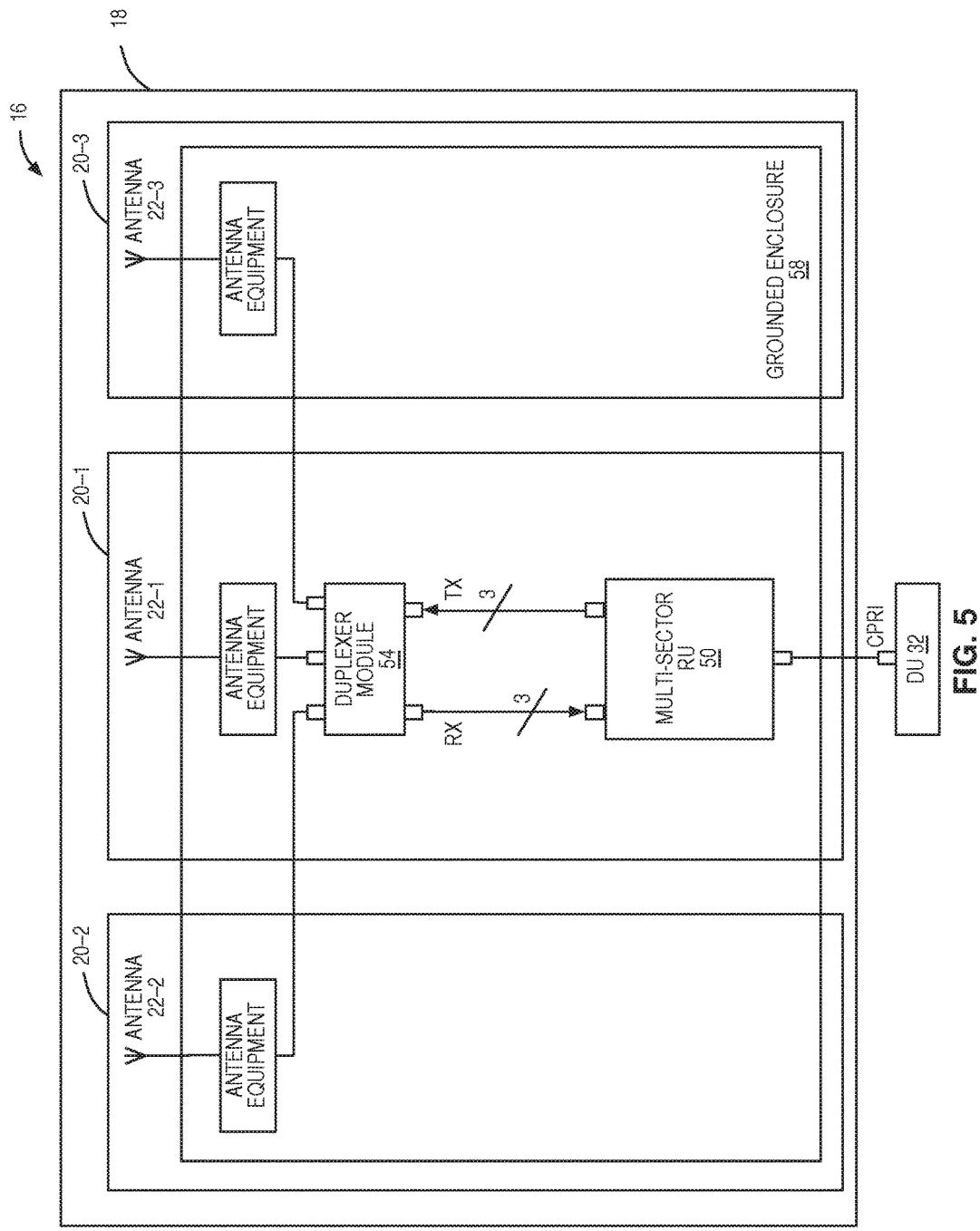
FIG. 5 is a block diagram of a system with a multi-sector RU according to another embodiment of the present disclosure.

FIG. 5 illustrates an embodiment that is similar to the embodiment disclosed in FIG. 4, except that the number of transmitters is not reconfigurable. In this regard, the system 16 only includes a single multi-sector RU 50 as discussed previously in relation to the embodiment of FIG. 4. In this embodiment, the transmission and reception signals for all of the antennas 22 are processed by the multi-sector RU 50. As such, there is no requirement for an AHM 24. The duplexer module 54 includes the necessary circuitry for providing RU 50, and for providing the output of the single multi-sector RU 50 to the plurality of antennas 22.

Also shown in FIG. 5 is a grounded enclosure 58 that provides additional lightning protection for the components that are inside the grounded enclosure 58 and the connections between them. This system 16 provides many benefits, such as simpler installation; multiple shared components, such as a power supply or processing component; and reduced external connections, according to some embodiments. This can lead to a reduction in power usage, a reduction in waste heat that needs to be dissipated, and a reduction in the amount of lightning protection needed.

Figure 6A:
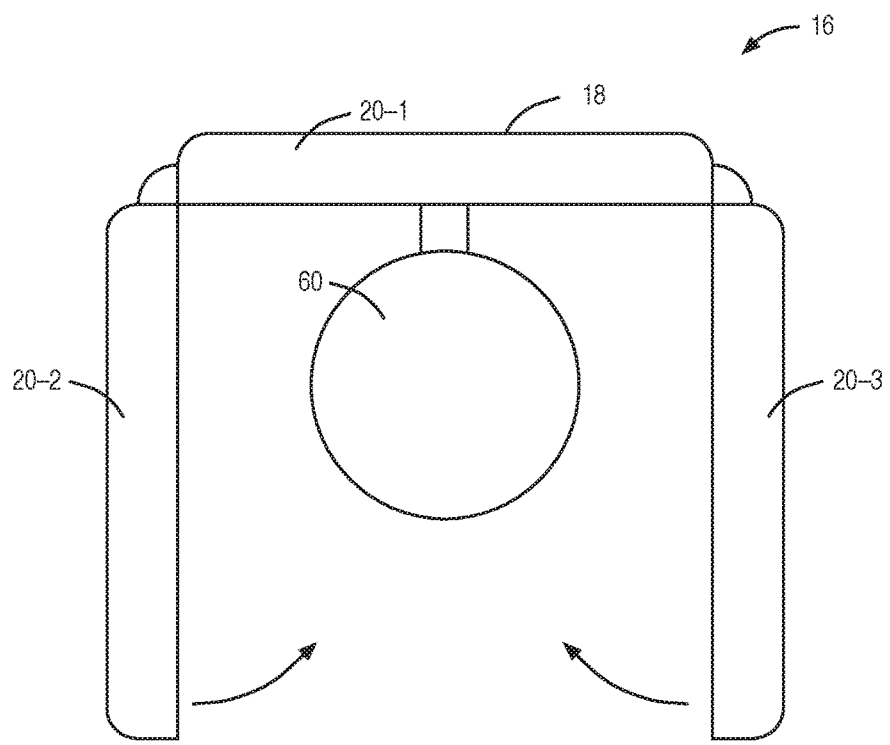
FIGS. 6A and 6B illustrate a possible mechanical arrangement for installation of a system according to one embodiment of the present disclosure.
Figure 6B:
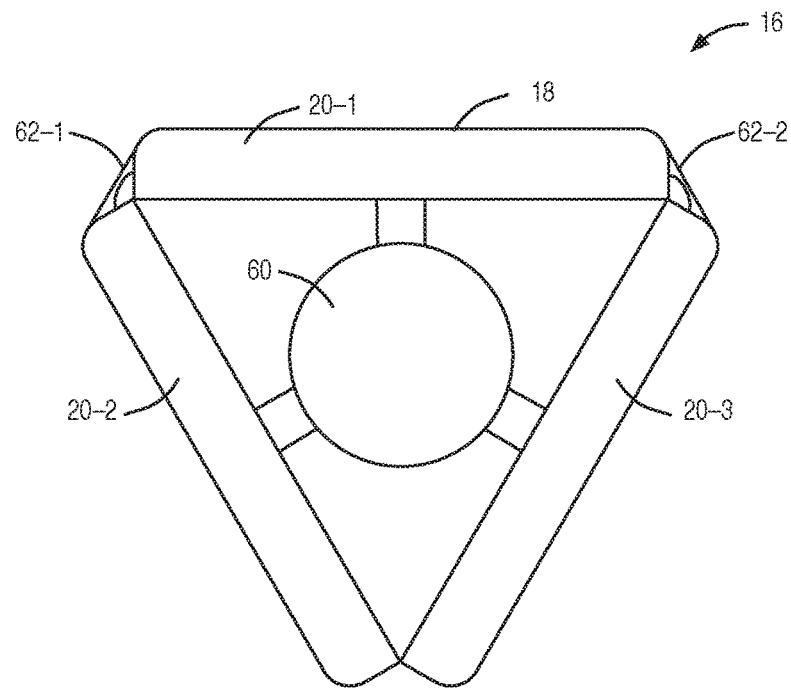

As discussed previously, the integrated unit 18 can be installed as a single component, according to some embodiments. FIGS. 6A and 6B illustrate a possible mechanical arrangement for installation of the integrated unit 18 on an existing or preinstalled mounting pole 60 according to one embodiment of the present disclosure. In this embodiment, the integrated unit 18 includes the three panels 20-1, 20-2, and 20-3, as previously discussed. The three panels 20-1, 20-2, and 20-3 house the antennas 22-1, 22-2, and 22-3, respectively. In this embodiment, the panels 20-1, 20-2, and 20-3 are connected by flexible connectors 62-1 and 62-2 that enable the integrated unit 18 to be folded around the existing or preinstalled mounting pole 60.

FIG. 6A shows the panel 20-1 attached to the mounting pole 60. The panels 20-2 and 20-3 may then be folded around and attached to the mounting pole 60 as shown in FIG. 6B. In this embodiment, the flexible connectors 62-1 and 62-2 provide shielding for cables running between the panels 20-1, 20-2, and 20-3. Providing this shielding allows most or all of the cabling to be integrated and preinstalled (or installed in an integrated way) such that no additional lightning protection is required for the panels 20-2 and 20-3 or on the cable connections between the panels 20. As discussed previously, this can reduce the complexity of the installation and reduce interconnect costs, according to some embodiments. More specifically, according to some embodiments, lightning protection is only required on an input power connector located in the panel 20-1. The power is then daisy chained to the panels 20-2 and 20-3 and is covered by shielding included in the flexible connectors 62-1 and 62-2 between the panels 20-1, 20-2, and 20-3. In other embodiments, lightning protection may also be required on one or more portions of the integrated antenna equipment such as the TMFs 34. Again, the integrated connections of the panels 20-2 and 20-3 to the main panel 20-1 may obviate the necessity of providing additional lightning protection to the antenna equipment of the panels 20-2 and 20-3. In one embodiment, this corresponds to the grounded enclosure 58 discussed previously with regard to FIG. 5.

Figure 7:
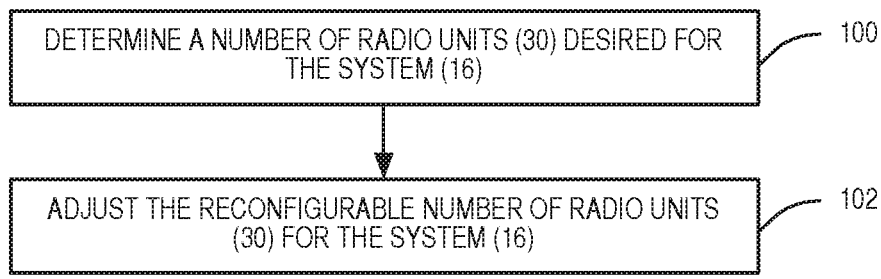
FIG. 7 illustrates the operation of reconfiguring a system, including adjusting the reconfigurable number of RUs according to one embodiment of the present disclosure.
Figure 8:
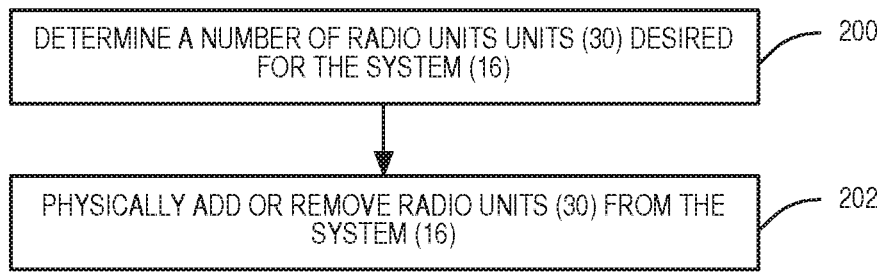
FIG. 8 illustrates the operation of reconfiguring a system, including physically adding or removing RUs according to one embodiment of the present disclosure.
Figure 9:
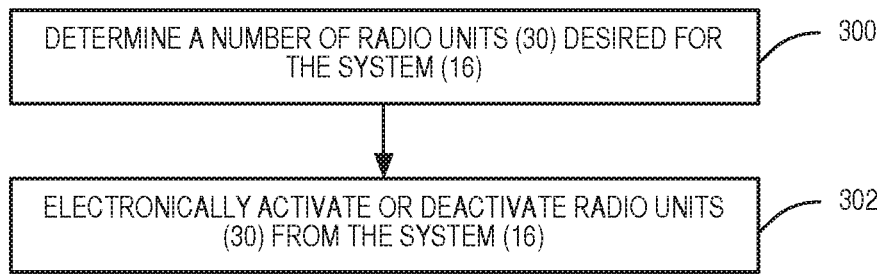
FIG. 9 illustrates the operation of reconfiguring a system, including electronically activating or deactivating RUs according to one embodiment of the present disclosure.

FIGS. 7-9 illustrate processes for reconfiguring the systems 16 of FIGS. 2-4 according to some embodiments of the present disclosure. FIG. 7 illustrates the operation of reconfiguring the system 16 according to one embodiment of the present disclosure. First, a number of RUs 30 desired for the system 16 is determined (step 100). This can be determined in many ways, such as by, e.g., calculating expected capacity and power needs for a site or by determining historical conditions, according to some embodiments. Next, the reconfigurable number of RUs 30 for the system 16 is adjusted (step 102). Various ways for accomplishing this step will be discussed in more detail below.

To illustrate one way to adjust the reconfigurable number of RUs 30 for the system 16, FIG. 8 illustrates the operation of reconfiguring a system 16 including physically adding or removing RUs 30 according to one embodiment of the present disclosure. After determining a number of RUs 30 desired for the system 16 (step 200), RUs 30 can be physically added to or removed from the system 16 (step 202). In one embodiment with only one RU 30 included in the integrated unit 18, the two unused AHM 24 feeder ports 26 are connected to external RF ports of the integrated unit 18. If one or more additional RUs 30 are determined to be needed, one or more RUs 30 can be connected to these external RF ports of the integrated unit 18. In one embodiment, the external RF ports are located within slots or cavities in the integrated unit 18, and the one or more RUs 30 can be installed inside these slots or cavities such that they are connected to the corresponding RF ports. These slots or cavities in the integrated unit 18 can also provide power connections for the additional RUs 30, in one embodiment. If multiple RUs 30 are installed, in one embodiment, the RUs 30 share the power for all of the antennas 22. If fewer RUs 30 are determined to be needed, one or more RUs 30 can be physically removed from the system 16. This can provide for operational cost savings, as well as equipment cost savings, since the removed RUs 30 could now be used elsewhere, according to one embodiment.

Alternatively, or in addition, in some embodiments, physically included RUs 30 may be electronically activated or deactivated. As discussed before in relation to physically adding RUs 30, by electronically activating additional RUs 30, the overall capacity of the system 16 may be increased. By electronically deactivating RUs 30, the overall power consumption of the system 16 may be decreased. This may be an attractive solution during low-traffic time periods such as late at night, according to one embodiment.

To illustrate this way to adjust the reconfigurable number of RUs 30 for the system 16, FIG. 9 illustrates the operation of reconfiguring a system 16 including electronically activating or deactivating RUs 30 according to one embodiment of the present disclosure. After determining a number of RUs 30 desired for the system 16 (step 300), the RUs 30 can be electronically activated or deactivated in the system 16 such that the desired number of RUs 30 is activated (step 302). Deactivating an RU 30 can be accomplished in many ways, such as, e.g., by fully powering down the RU 30 or by switching the RU 30 to a receive-only mode of operation. Deactivating an RU 30 allows power savings to be realized and the amount of waste heat generated to be reduced. Activating an RU 30 can also be accomplished in many ways, such as, e.g., by powering on the RU 30 or switching the RU 30 to a more fully functioning mode of operation.

The following acronyms are used throughout this disclosure.
AHM Analog Hybrid Matrix
AIR Antenna Integrated Radio
BTS Base Transceiver Station
CPRI Common Public Radio Interface
DCR Digitally Convertible Radio
DDCR Distributed Digitally Convertible Radio
DDHM Distributed Digital Hybrid Matrix
DHM Digital Hybrid Matrix
eNB Enhanced Node-B
LO Local Oscillator
RF Radio Frequency
RMSAIR Reconfigurable Multi-sector AIR
RU Radio Unit
TMA Tower Mounted Amplifier
TMF Tower Mounted Frequency Shift Those skilled in the art will recognize improvements and modifications to the embodiments of the present disclosure. All such improvements and modifications are considered within the scope of the concepts disclosed herein and the claims that follow.

What is claimed is:

1. A system for a multi-sector base station in a cellular communications network, comprising:
an integrated unit comprising:
a plurality of antennas serving a plurality of sectors;
an analog hybrid matrix comprising:
a plurality of feeder ports, and
a plurality of antenna ports, each of the plurality of antenna ports being coupled to a different one of the plurality of antennas via corresponding antenna equipment; and
a radio unit coupled to one of the plurality of feeder ports of the analog hybrid matrix and thereby coupled to the plurality of antennas;
wherein the analog hybrid matrix is operative to:
receive a plurality of radio frequency receive signals from the corresponding antenna equipment at the plurality of antenna ports, wherein each of the plurality of radio frequency receive signals is at a different carrier frequency due to different frequency shifts applied to the plurality of radio frequency receive signals via the corresponding antenna equipment, and
generate a plurality of transformed radio frequency receive signals at the plurality of feeder ports such that one of the plurality of transformed radio frequency receive signals is output to the radio unit via the one of the plurality of feeder ports, wherein each of the plurality of transformed radio frequency receive signals comprises a component for each of the plurality of radio frequency receive signals.

2. The system of claim 1 further comprising one or more additional radio units that together with the radio unit form a plurality of radio units of the system, wherein each radio unit of the plurality of radio units is connected to a different one of the plurality of feeder ports of the analog hybrid matrix.

3. The system of claim 2 wherein the one or more additional radio units are physically attached to the integrated unit, and a number of additional radio units in the one or more additional radio units is reconfigurable.

4. The system of claim 2 wherein the radio units in the plurality of radio units are phase-locked.

5. The system of claim 2 wherein the integrated unit further comprises the one or more additional radio units.

6. The system of claim 5 wherein each of the one or more additional radio units is configurable in either an active state or an inactive state.

7. The system of claim 1 wherein the analog hybrid matrix is further operative to:

receive an amplified radio frequency transmit signal from the radio unit at the one of the plurality of feeder ports, and split the amplified radio frequency transmit signal to thereby generate a plurality of amplified radio frequency transmit signals at the plurality of antenna ports.

8. The system of claim 1 wherein the radio unit is a multi-sector radio unit.

9. The system of claim 1 wherein the integrated unit comprises a grounded enclosure that provides lightning protection.

10. The system of claim 1 wherein the integrated unit further comprises a plurality of panels where each panel corresponds to one of the plurality of sectors and comprises one or more of the plurality of antennas and each pair of adjacent panels is joined by a corresponding flexible connection that allows the integrated unit to be folded around an existing structure.

11. The system of claim 1 wherein the plurality of feeder ports is connected to a plurality of radio units comprising the radio unit and at least one additional radio unit such that each of the plurality of feeder ports is coupled to a different transceiver circuit of the plurality of radio units via a corresponding feeder cable.

12. The system of claim 11 wherein the analog hybrid matrix is operative to:

receive a plurality of transformed radio frequency transmit signals from transceiver circuits of the reconfigurable number of radio units at the plurality of feeder ports, each transformed radio frequency transmit signal of the plurality of transformed radio frequency transmit signals comprising a component for each of a plurality of radio frequency transmit signals to be transmitted via the plurality of antennas; and split and combine the plurality of transformed radio frequency transmit signals to generate the plurality of radio frequency transmit signals at the plurality of antenna ports.

13. The system of claim 1 comprising a plurality of radio units including the radio unit and at least one additional radio unit, wherein each radio unit of the plurality of radio units comprises:

a feeder port operative to couple the radio unit to a corresponding one of the plurality of feeder ports of the analog hybrid matrix;

a distributed digital hybrid matrix component operative to transform a plurality of digital transmit signals into a transformed transmit signal comprising a component for each of the plurality of digital transmit signals; and a transmitter operative to upconvert and amplify the transformed transmit signal to provide a transformed radio frequency transmit signal to be output to the analog hybrid matrix via the feeder port.

14. The system of claim 13 wherein the distributed digital hybrid matrix components of the plurality of radio units form a distributed digital hybrid matrix that converts the plurality of digital transmit signals into a plurality of transformed transmit signals, each comprising a component for each of the plurality of digital transmit signals.

15. The system of claim 14 wherein the radio unit comprises one or more components operative to adaptively configure the distributed digital hybrid matrix component and at least one additional distributed digital hybrid matrix component of the at least one additional radio unit.

16. A method of configuring a system for a multi-sector base station in a cellular communications network comprising an integrated unit, the integrated unit comprising a plurality of antennas, an analog hybrid matrix, and a reconfigurable number of radio units coupled to the plurality of antennas, the analog hybrid matrix comprising a plurality of feeder ports and a plurality of antenna ports, the method comprising:

determining a number of radio units desired for the system; and adjusting the reconfigurable number of radio units, wherein the plurality of antenna ports are connected to the plurality of antennas via corresponding antenna equipment, and wherein the analog hybrid matrix performs the steps of:

receiving a plurality of radio frequency receive signals from the corresponding antenna equipment at the plurality of antenna ports, where each of the plurality of radio frequency receive signals is at a different carrier frequency due to different frequency shifts applied by the corresponding antenna equipment; and generating a plurality of transformed radio frequency receive signals at the plurality of feeder ports such that a different one of the plurality of transformed radio frequency receive signals is output to each of the transceiver circuits of the reconfigurable number of radio units via a corresponding one of the plurality of feeder ports, wherein each of the plurality of transformed radio frequency receive signals comprises a component for each of the plurality of radio frequency receive signals.

17. The method of claim 16 wherein adjusting the reconfigurable number of radio units comprises physically adding or removing radio units to or from the system.

18. The method of claim 16 wherein adjusting the reconfigurable number of radio units comprises electronically activating or deactivating radio units from the system.

* * * * *